US012802591B2

(12) United States Patent
Kikuchi et al.

(10) Patent No.: US 12,802,591 B2
(45) Date of Patent: Nov. 17, 2026

(54) SECURE COMPUTATION DEVICE, SECURE COMPUTATION METHOD, AND PROGRAM

(71) Applicant: NTT, Inc., Tokyo (JP)

(72) Inventors: Ryo Kikuchi, Tokyo (JP); Dai Ikarashi, Tokyo (JP); Ibuki Mishina, Tokyo (JP); Hiroki Sudo, Tokyo (JP)

(73) Assignee: NTT, Inc., Tokyo (JP)

( * ) Notice: Subject to any disclaimer, the term of this patent is extended or adjusted under 35 U.S.C. 154(b) by 62 days.

(21) Appl. No.: 18/868,751

(22) PCT Filed: May 31, 2022

(86) PCT No.: PCT/JP2022/022111
§ 371 (c)(1),
(2) Date: Nov. 24, 2024

(87) PCT Pub. No.: WO2023/233516
PCT Pub. Date: Dec. 7, 2023

(65) Prior Publication Data
US 2025/0349228 A1 Nov. 13, 2025

(51) Int. Cl.
*G09C 1/00* (2006.01)

(52) U.S. Cl.
CPC .................................... *G09C 1/00* (2013.01)

(58) Field of Classification Search
CPC ........................................................ G09C 1/00
See application file for complete search history.

(56) References Cited

U.S. PATENT DOCUMENTS

| | | | | |
|---|---|---|---|---|
| 2021/0058239 | A1* | 2/2021 | Ikarashi | H04L 9/085 |
| 2021/0165906 | A1* | 6/2021 | Boehler | G06F 21/52 |
| 2024/0022395 | A1* | 1/2024 | Hoshizuki | G06F 21/60 |

OTHER PUBLICATIONS

Kikuchi et al. (2020) "Secure cross-sector customer-flow invention" 2020 Symposium on Cryptography and Information Security, Kochi, Japan, Jan. 28-31, 2020, The Institute of Electronics, Information and Communication Engineers.

* cited by examiner

*Primary Examiner* — Sangseok Park

(57) ABSTRACT

A secure computation device includes a dummy record separating/sorting unit that sorts a table, a boundary flag generation unit that generates a boundary flag, an addition value generation unit that generates an addition value, a boundary sorting unit that stably sorts a table, a difference value generation unit that generates a difference value, and an operation result output unit that outputs a table.

5 Claims, 14 Drawing Sheets

| [$\vec{k}$] | [$\vec{v}$] | [$\vec{f}$] (flag) |
|---|---|---|
| [1] | [2] | [1] |
| [1] | [3] | [1] |
| [4] | [4] | [1] |
| [2] | [3] | [0] |
| [4] | [5] | [1] |
| [3] | [4] | [0] |
| [2] | [1] | [1] |

FIG. 4

FIG. 5

| $[\vec{k}']$ | $[\vec{v}']$ | $[\vec{f}']$ (flag) |
|---|---|---|
| [1] | [2] | [1] |
| [1] | [3] | [1] |
| [2] | [1] | [1] |
| [4] | [4] | [1] |
| [4] | [5] | [1] |
| [2] | [3] | [0] |
| [3] | [4] | [0] |

FIG. 6

| [k'→] | [v'→] | [f'→] (flag) | [e'→] (flag) |
|---|---|---|---|
| [1] | [2] | [1] | [1] |
| [1] | [3] | [1] | [0] |
| [2] | [1] | [1] | [0] |
| [4] | [4] | [1] | [1] |
| [4] | [5] | [1] | [0] |
| [2] | [3] | [0] | [1] |
| [3] | [4] | [0] | [1] |

FIG. 7

| [$\vec{k}'$] | [$\vec{v}'$] | [$\vec{x}$] | [$\vec{f}'$] (flag) | [$\vec{e}'$] (flag) |
|---|---|---|---|---|
| [1] | [2] | [2] | [1] | [1] |
| [1] | [3] | [5] | [1] | [0] |
| [2] | [1] | [6] | [1] | [0] |
| [4] | [4] | [10] | [1] | [1] |
| [4] | [5] | [15] | [1] | [0] |
| [2] | [3] | [18] | [0] | [1] |
| [3] | [4] | [22] | [0] | [1] |

| $[\vec{k}'']$ | $[\vec{x}']$ | $[\vec{e}'']$ (flag) |
|---|---|---|
| [1] | [5] | [0] |
| [2] | [6] | [0] |
| [4] | [15] | [0] |
| [1] | [2] | [1] |
| [4] | [10] | [1] |
| [2] | [18] | [1] |
| [3] | [22] | [1] |

FIG. 8

FIG. 9

| $[\vec{k''}]$ | $[\vec{x''}]$ | $[\vec{x'}]$ | $[\vec{e''}]$ (flag) |
|---|---|---|---|
| [1] | [5] | [5] | [0] |
| [2] | [1] | [6] | [0] |
| [4] | [9] | [15] | [0] |
| [1] | [-13] | [2] | [1] |
| [4] | [8] | [10] | [1] |
| [2] | [8] | [18] | [1] |
| [3] | [4] | [22] | [1] |

FIG. 10

| $[\vec{k}'']$ | $[\vec{x}'']$ | $[\vec{e}''']$ (flag) |
|---|---|---|
| [1] | [5] | [1] |
| [2] | [1] | [1] |
| [4] | [9] | [1] |
| [1] | [-13] | [0] |
| [4] | [8] | [0] |
| [2] | [8] | [0] |
| [3] | [4] | [0] |

FIG. 11

| $[k'''^{\rightarrow}]$ | $[x''''^{\rightarrow}]$ | $[e'''^{\rightarrow}]$ (flag) |
|---|---|---|
| [1] | [5] | [1] |
| [2] | [1] | [1] |
| [4] | [9] | [1] |
| [null] | [0] | [0] |
| [null] | [0] | [0] |
| [null] | [0] | [0] |
| [null] | [0] | [0] |

FIG. 12

```
([[k†→]], [[v†→]])←BITDECOMP([k→], [v→])
[[f*→]]←1-[[f→]]
<π>←GENPERM([[f*→]], [[k†→]], [[v†→]])
([[k' →]], [k' →], [v' →] [[f' →]])←SORT(<π>, ([[k†→]], [k→], [v→], [[f→]]))
each 1≦i≦m-1 do
    [[e_i]]←IFTHEN([[f_i' ]]:EQ([[k_i' ]], [[k_{i+1}']]), [[1]])
    [[e'_i]]←IFTHEN([[f_i']]XOR[[f_{i+1}']]:[[0]], [[e_i]])
    [e'_i]←MODCONV([[e'_i]])
[[e'_m]]=1-[[f'_m]]
[e'_m]←MODCONV([[e'_m]])
for 1≦i≦m do
    [x_i]←[v'_i]+[v'_{i+1}]
<π'>←GENPERM([[e'→]])
([x' →], [[e'' →]], [k'' ])←SORT(<π'>, ([x→], [[e'→]], [k' →]))
each 2≦i≦m do
    [x''_i]← [x'_i]-[x'_{i-1}]
[[e'''→]] =1-[[e'→]]
Output ([k'' →], [x''→], [[e'''→]])
```

FIG. 13

```
([[k†→]], [[v†→]])←BITDECOMP([k→], [v→])
[[f*→]]←1-[[f→]]
⟨π⟩←GENPERM([[f*→]], [[k†→]], [[v†→]])
([[k' →]], [k' →], [v' →] [[f' →]])←SORT(⟨π⟩, ([[k†→]], [k→], [v→], [[f→]]))
each 1≦i≦m-1 do
    [[e_i]]←IFTHEN([[f_i' ]]:EQ([[k_i' ]], [[k_{i+1}']]), [[1]])
    [[e'_i]]←IFTHEN([[f_i']] XOR [[f_{i+1}']] : [[0]], [[e_i]])
    [e'_i]←MODCONV([[e'_i]])
[[e'_m]]=1-[[f' _m]]
[e'_m]←MODCONV([[e'_m]])
for 1≦i≦m do
    [x_i]←[v'_i]+[v'_{i+1}]
⟨π'⟩←GENPERM([[e'→]])
([x' →], [[e'' →]], [k'' ])←SORT(⟨π' ⟩, ([x→], [[e'→]], [k' →]))
each 2≦i≦m do
    [x''_i]← [x'_i]-[x'_{i-1}]
    [k'''_i]←IFTHEN([e'_i] : [null], [k''_i])
    [x''''_i]←IFTHEN([e'_i] : [0], [x'''_i])
[[e'''→]] =1-[[e'→]]
Output ([k'''→], [x''''→], [[e'''→]])
```

SECURE COMPUTATION DEVICE, SECURE COMPUTATION METHOD, AND PROGRAM

CROSS-REFERENCE TO RELATED APPLICATIONS

This application is a U.S. 371 Application of International Patent Application No. PCT/JP2022/022111, filed on 31 May 2022, the disclosure of which is hereby incorporated herein by reference in its entirety.

TECHNICAL FIELD

The present invention relates to a secure computation device, a secure computation method, and a program for performing a set operation in a state where data having an encrypted dummy flag column is encrypted.

BACKGROUND ART

In order to handle data safely, techniques called secure computation in which analysis is performed in a state in which encryption is performed have been studied. Among the techniques, encrypted database processing is considered in order to efficiently perform extraction of data that satisfies conditions, calculation of a total value, and the like in a state in which encryption is performed.

A Group-by operation that is a type of database (DB) processing is grouping processing in which a table is used as an input, grouping is performed for each value of a designated column, and in some cases, a statistical value for each group is calculated and output in a table format. Non Patent Literature 1 proposes a method of performing the Group-by operation in a state where encryption is performed. An input/output considered here is a table obtained by encrypting a normal table for each element.

CITATION LIST

Non Patent Literature

Non Patent Literature 1: Ryo Kikuchi, Koki Hamada, Dai Ikarashi, Gen Takahashi, Katsumi Takahashi, "Secure cross-sector customer-flow invention" In SCIS, 2020.

SUMMARY OF INVENTION

Technical Problem

On the other hand, in a case where the database processing is performed in a state where encryption is performed, the input/output thereof is different from that of a normal table, and there is a case where a dummy record is inserted and a dummy flag column (a column of a dummy flag indicating whether or not the corresponding record is a dummy record) is given.

In the case of such an input, the algorithm proposed in Non Patent Literature 1 does not function. This is because, in addition to the different input formats, it has been conventionally assumed that all records are meaningful values, and thus, it is not possible to perform processing while skipping a dummy record, and a value of v to be ignored affects the final result, and accordingly, it is not possible to obtain the original result.

Therefore, an object of the present invention is to provide a secure computation device capable of performing a set operation in a state where data having an encrypted dummy flag column is encrypted.

Solution to Problem

According to the present invention, there is provided a secure computation device that performs a Groupby-sum operation on an encrypted first table including a key column, a value column, and a dummy flag column indicating whether or not a corresponding record is a dummy record, in a state where the first table is concealed based on the key column. The secure computation device includes a dummy record separating/sorting unit, a boundary flag generation unit, an addition value generation unit, a boundary sorting unit, a difference value generation unit, and an operation result output unit.

The dummy record separating/sorting unit sorts the first table by giving a first priority to a case where, in a case where the corresponding record is not a dummy record, the record is set to have a higher rank, and giving a second priority to the key column. The boundary flag generation unit generates a boundary flag having a flag value indicating that a record is a boundary in a case where the record corresponds to any of first to third cases, and that a record is not a boundary in a case where the record does not correspond to any of the first to third cases, when a case where a certain record is not the dummy record and a key of the certain record is different from a key of a record immediately below the certain record is set as the first case, a case where a certain record is not the dummy record and a record immediately below the certain record is the dummy record is set as a second case, and a case where a certain record is not the dummy record and is a record located at a bottom is set as the third case. The addition value generation unit adds all values located at positions higher than a certain record to a value of the certain record and generates an addition value of the corresponding record. The boundary sorting unit stably sorts a second table including a key column, an addition value column, and a boundary flag column by giving a priority to a case where a boundary record is set to have a higher rank. The difference value generation unit generates a difference value by setting an addition value of a highest record in the second table as the difference value as it is and setting, as the difference value, a difference of an addition value of a second record and a subsequent record in the second table from an addition value of a record immediately above the second record or subsequent record. The operation result output unit outputs a third table including a key column, a difference value column, and a boundary flag column.

Advantageous Effects of Invention

According to the secure computation device of the present invention, it is possible to perform a set operation in a state where data having an encrypted dummy flag column is encrypted.

BRIEF DESCRIPTION OF DRAWINGS

FIG. 4 is a diagram illustrating an example of the first table input to the secure computation device.

FIG. 5 is a diagram illustrating an example of the first table after processing by a dummy record separating/sorting unit.

FIG. 6 is a diagram illustrating an example of the first table after processing by a boundary flag generation unit.

FIG. 7 is a diagram illustrating an example of the first table after processing by an addition value generation unit.

FIG. 8 is a diagram illustrating an example of a second table after processing by a boundary sorting unit.

FIG. 9 is a diagram illustrating an example of a second table after processing by a difference value generation unit.

FIG. 10 is a diagram illustrating an example of a third table output by an operation result output unit.

FIG. 11 is a diagram illustrating an example of a third table output by a second operation result output unit.

FIG. 12 is a diagram illustrating an algorithm up to processes (Steps S11 to S16) of the secure computation device.

FIG. 13 is a diagram illustrating an algorithm up to processes (Steps S11 to S17) of the secure computation device.

DESCRIPTION OF EMBODIMENTS

<Components>

Figure 1:
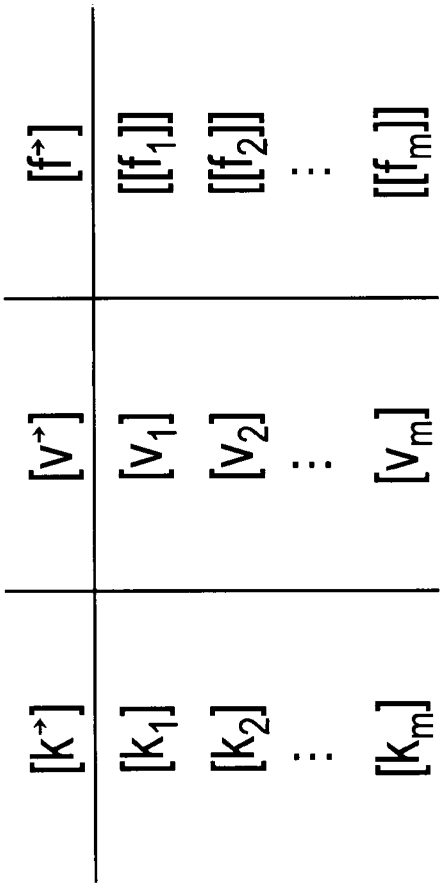
FIG. 1 is a diagram for describing an outline of encrypted data (first table) input to a secure computation device.

Encrypted data is written as [x], a vector is written as $\vec{x}=(x_1, \ldots, x_n)$, and $[\vec{x}]=([x_1], \ldots, [x_n])$ is set.

Encryption is assumed to be a technique in which the following operations can be performed in a state in which encryption is performed, such as secret sharing (for example, Referenced Non Patent Literature 1) or homomorphic encryption (for example, Referenced Non Patent Literature 2).

(Referenced Non Patent Literature 1: Dai Ikarashi, Ryo Kikuchi, Koki Hamada, and Koji Chida. Actively private and correct MPC scheme in t<n/2 from passively secure schemes with small overhead. IACR Cryptology ePrint Archive, Vol. 2014, p. 304, 2014.)

(Referenced Non Patent Literature 2: Zvika Brakerski, Craig Gentry, and Vinod Vaikuntanathan. Fully homomorphic encryption without bootstrapping. Electronic Colloquium on Computational Complexity (ECCC), Vol. 18, p. 111, 2011.)

Since a different type of encryption may be used for a value to be stored, normal secret encryption is denoted as [·], a bit value is denoted as [[·]], and replacement is denoted as <π>.

<<Addition/Subtraction, Integer Multiple>>

Secret sharing and homomorphic encryption are naturally supported. c[a]±[b]=[ca±b] or the like is written.

<<Multiplication>>

Multiplication can be calculated by a method described in Referenced Non Patent Literature 1 in a case of secret sharing, or by a homomorphic operation in a case of homomorphic encryption. This is expressed as [c]←Mult ([a], [b]) (where c=ab).

<<Stable Sorting>>

This is an operation of rearranging the input $[\vec{x}]=([x_1], \ldots, [x_n])$ into $[\vec{x'}]=([x'_1], \ldots, [x'_n])$ such that $X'_i \le x'_{i+1}$ for $i \in \{1, \ldots, n-1\}$. It is assumed that, when $x'_i = x'_{i-1}$ is satisfied, the original arrangement order of $\vec{x}$ is prioritized. Stable sorting more specifically includes two algorithms (GenPerm, Sort).

<π>←GenPerm ($[\vec{x}]$): <π> obtained by encrypting permutation π for rearranging $\vec{x}$ is output.

$[\vec{x'}]$←Sort (<π>, $[\vec{x}]$): calculation is performed in a state where π is applied to $\vec{x}$, and the rearranged $\vec{x'}$ is encrypted.

For simplicity, when a plurality of vectors are sorted by the same permutation, ($[\vec{x'}]$, $[\vec{y'}]$)←Sort (<π>, ($[\vec{x}]$, $[\vec{y}]$)) or the like is written. An obvious configuration method is a sorting network. In addition, in the case of secret sharing, there is an improved efficiency such as Referenced Non Patent Literature 3.

(Referenced Non Patent Literature 3: Koji Chida, Koki Hamada, Dai Ikarashi, Ryo Kikuchi, Naoto Kiribuchi, and Benny Pinkas. An efficient secure three-party sorting protocol with an honest majority. IACR Cryptology ePrint Archive, Vol. 2019, p. 695, 2019.)

<<Modulus Conversion>>

This is a method of generating [a] that is encryption of the same value but differs in the form of the ciphertext using encryption [[a]] of a bit value as an input. [a]←ModConv ([[a]]). A specific example is disclosed in, for example, Referenced Non Patent Literature 4.

(Referenced Non Patent Literature 4: Ryo Kikuchi, Dai Ikarashi, Takahiro Matsuda, Koki Hamada, and Koji Chida. Efficient bit decomposition and modulus-conversion protocols with an honest majority. In ACISP 2018, pp. 64-82, 2018.)

<<Bit Decomposition>>

A method of generating [[k]] that is encryption of the same value in which k is represented in bits, but differs in the form of the ciphertext using encryption [k] of an integer value as an input. $[[\vec{k}]]$←BitDecomp ($[\vec{k}]$) is written. Where, when $\vec{k}=(k_1, k_2, \ldots, k_l)$ is satisfied, $k=\Sigma^{l}_{i=1} 2^{i-1} k_i$ is satisfied. A specific example is disclosed in, for example, Referenced Non Patent Literature 4.

<Equal Sign Determination>

[e] with 1 if x=y, and 0 if x≠y is output using [x], [y] as an input. [e]←Eq ([x], [y]), where e={1 if x=y|0 otherwise}, is written. In addition, in a case where equal sign determination of a plurality of elements is performed, [e]←Eq (([a], [b]), ([c], [d])) where e={1 if a=c and b=d|0 otherwise} is also written.

In general, if data is encrypted in bit representation, it is sufficient to perform circuit calculation to determine whether or not each bit of [x−y] is 0, and the circuit calculation can be performed by addition/subtraction and multiplication. In the case of encryption in integer representation, the circuit may be similarly calculated by changing to bit representation using bit decomposition (Referenced Non Patent Literature 4). In addition, if encryption is performed on mod p, $[(x-y)^{p-1}]$ can be calculated using multiplication.

<<If-Then>>

A method of outputting [x] if f=1 and [y] if f=0 by using flag [f], where f∈{0, 1}, and [x], [y] as inputs. [e]←Ifthen ([f]: [x], [y]), where e={x if f=1|y otherwise}, is written. Mult ([f], [x])+Mult ([1−f], [y]), or the like can be expressed.

Definition of Input

The input includes the number m of records, a key $\vec{k}$, a value $\vec{v}$, and a flag $\vec{f}$. The flag is set to a share of bits. If the input is not in bit expression, conversion into bits is performed by a bit decomposition protocol. FIG. 1 illustrates an outline of encrypted data (first table) input to a secure computation device.

Hereinafter, embodiments of the present invention will be described in detail. Note that components having the same functions will be denoted by the same reference numerals, and redundant description will be omitted. Note that, in the following description of the examples and the drawings, a symbol [[ ]] indicating encrypted data of a bit value may be abbreviated as [ ] in some cases.

Example 1

Figure 2:
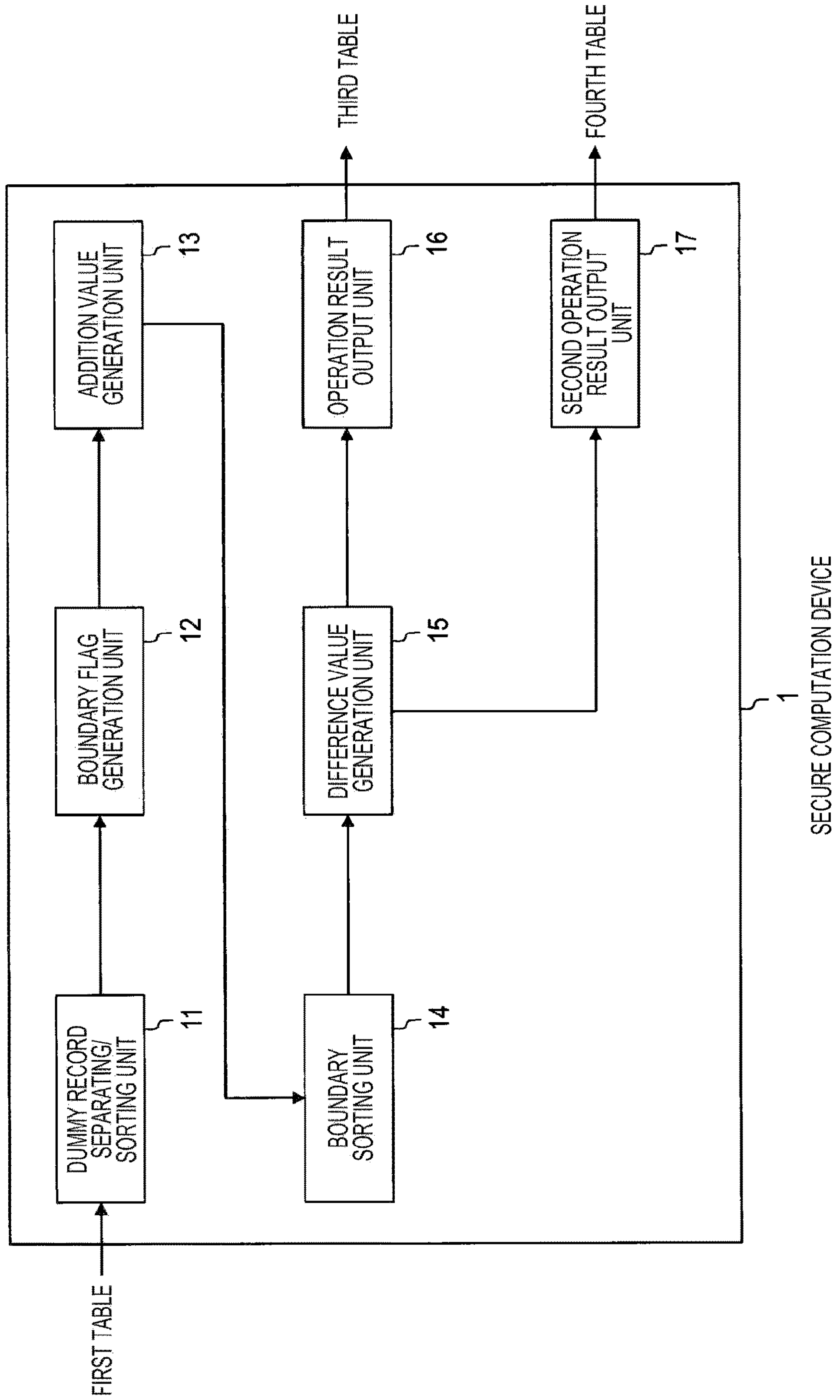
FIG. 2 is a block diagram illustrating a functional configuration of a secure computation device in Example 1.

A functional configuration of a secure computation device according to Example 1 will be described below with reference to FIG. 2. According to the present example, there is provided a secure computation device 1 that performs a Groupby-sum operation on an encrypted first table including a key column, a value column, and a dummy flag column indicating whether or not a corresponding record is a dummy record, in a state where the first table is concealed based on the key column. As illustrated in FIG. 2, the secure computation device 1 includes a dummy record separating/sorting unit 11, a boundary flag generation unit 12, an addition value generation unit 13, a boundary sorting unit 14, a difference value generation unit 15, an operation result output unit 16, and a second operation result output unit 17.

Figure 3:
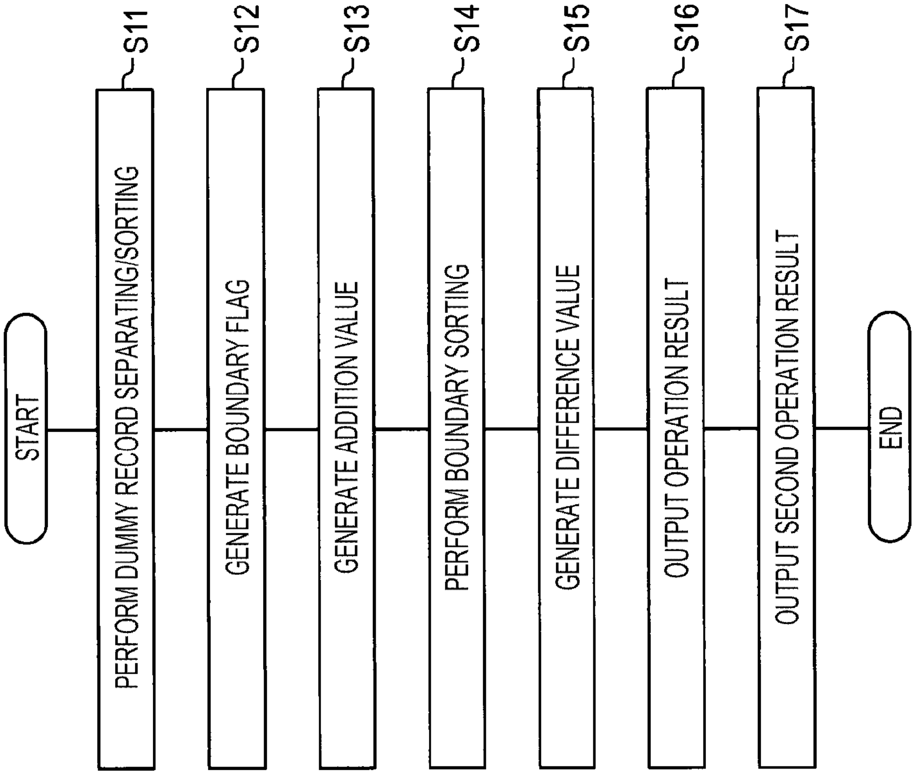
FIG. 3 is a flowchart illustrating an operation of the secure computation device in Example 1.

An operation of each configuration requirement will be described below with reference to FIG. 3.

<Dummy Record Separating/Sorting Unit 11>

The dummy record separating/sorting unit 11 sorts the first table by giving a first priority to a case where, in a case where the corresponding record is not a dummy record, the record is set to have a higher rank, and giving a second priority to the key column (S11). The processing of the dummy record separating/sorting unit 11 corresponds to processes of the first to fourth lines of an algorithm illustrated in FIG. 12.

A case where the first table illustrated in FIG. 4 is input to the secure computation device 1 and processed by the dummy record separating/sorting unit 11 will be described below with reference to the first to fourth lines of the algorithm. In the algorithm in the example of FIG. 12, a case where the corresponding record is not a dummy record is expressed as $[f^{\rightarrow}]=[1]$. That is, a case where the corresponding record is a dummy record is expressed as $[f^{\rightarrow}]=[0]$.

Therefore, the dummy record separating/sorting unit 11 sorts records in ascending order by using the negation of $[f^{\rightarrow}]$ (the second line of the algorithm) as a key of a first priority (third and fourth lines of the algorithm). Alternatively, the dummy record separating/sorting unit 11 may sort the records in descending order by using $[f^{\rightarrow}]$ as the key of the first priority. Furthermore, the dummy record separating/sorting unit 11 sorts the records by using a key column, that is, $[k^{\rightarrow}]$ as a key of a second priority (third and fourth lines of the algorithm).

FIG. 5 illustrates the first table after the first table illustrated in FIG. 4 is processed by the dummy record separating/sorting unit 11. The record as the sorting result is expressed by adding "'", that is, $[k'^{\rightarrow}]$, $[v'^{\rightarrow}]$, $[f'^{\rightarrow}]$.

As illustrated in FIG. 5, it can be seen that records ($[f^{\rightarrow}]=[1]$) that are not dummy records are collected in high ranks, and are further sorted in ascending order based on $[k^{\rightarrow}]$.

<Boundary Flag Generation Unit 12>

The boundary flag generation unit 12 generates a boundary flag having a flag value indicating that a record is a boundary in a case where the record corresponds to any of first to third cases, and that a record is not the boundary in a case where the record does not correspond to any of the first to third cases, when a case where a certain record is not the dummy record and a key of the certain record is different from a key of a record immediately below the certain record is set as the first case, a case where a certain record is not the dummy record and a record immediately below the certain record is the dummy record is set as a second case, and a case where a certain record is not the dummy record and is a record located at a bottom is set as the third case (S12). The processing of the boundary flag generation unit 12 corresponds to processes of the fifth to tenth lines of the algorithm illustrated in FIG. 12.

A case where the first table illustrated in FIG. 5 is processed by the boundary flag generation unit 12 will be described below with reference to the fifth to tenth lines of the algorithm.

In the example of FIG. 5, the records on the second and third rows correspond to a case where the i-th record is not a dummy record (m is set to the number of records included in the table, i=1, . . . , m−1 is set, and $f'_i=1$) and the key of the i-th record is different from the key of the (i+1)-th record ($k'_i \neq k'_{i+1}$) (first case), and $[e'^{\rightarrow}]=[0]$ indicating that the records are a boundary is given to the records on the second and third rows (the sixth line of the algorithm).

In addition, the record on the fifth row corresponds to a case where the i-th record is not a dummy record ($f'_i=1$) and the (i+1)-th record is a dummy record ($f'_{i+1}=0$) (second case), and $[e'^{\rightarrow}]=[0]$ indicating that the record is a boundary is given to the record in the fifth row (the seventh line of the algorithm).

In addition, a case where a certain record is not a dummy record and is a record located at the bottom ($f'_m=1$) (third case) corresponds to a case where there is no dummy record. Therefore, there is no corresponding record in the example of FIG. 5, but $[e'^{\rightarrow}]=[0]$ indicating that the record is a boundary is given (the eighth line of the algorithm) in a case where there is such a record.

Furthermore, the records on the first, fourth, seventh, and eighth rows do not correspond to any of the first to third case in the example of FIG. 5, and $[e'^{\rightarrow}]=[1]$ indicating that the record is not a boundary is given.

FIG. 6 illustrates the first table after the first table illustrated in FIG. 5 is processed by the boundary flag generation unit 12.

<Addition Value Generation Unit 13>

The addition value generation unit 13 adds all values located at positions higher than a certain record to a value of the certain record and generates an addition value of the corresponding record (S13). The processing of the addition value generation unit 13 corresponds to processes of the eleventh and twelfth lines of the algorithm illustrated in FIG. 12.

A case where the first table illustrated in FIG. 6 is processed by the addition value generation unit 13 will be described below with reference to the eleventh and twelfth lines of the algorithm.

In the example of FIG. 6, all values ($[v'_1]+ . . . + [v'_{i-1}]$) located at positions higher than the i-th record are added to the value $[v'_i]$ of the i-th record ($[x_i]=[v'_1]+ . . . +[v'_i]$), and an addition value $[x_i]$ of the i-th record is generated. Note that, for the highest value $[v'_1]$, there is no value located at a position higher than the record, and thus $[x_1]=[v'_1]$ is satisfied.

FIG. 7 illustrates the first table after the first table illustrated in FIG. 6 is processed by the addition value generation unit 13. As illustrated in FIG. 7, $[x_1]=[v'_1]=[2]$, $[x_2]=[v'_1]+[v'_2]=[2]+[3]=[5]$, $[x_3]=[v'_1]+[v'_2]+[v'_3]=[2]+[3]+[1]=[6]$, . . . , are satisfied.

<Boundary Sorting Unit 14>

The boundary sorting unit 14 stably sorts a second table including a key column, an addition value column, and a boundary flag column by giving a priority to a case where a boundary record is set to have a higher rank (S14). The processing of the boundary sorting unit 14 corresponds to processes of the thirteenth and fourteenth lines of the algorithm illustrated in FIG. 12.

A case where the first table illustrated in FIG. 7 is processed by the boundary sorting unit 14 will be described below with reference to the thirteenth and fourteenth lines of the algorithm.

In the example of FIG. 7, a second table including a key column $[k'^{\rightarrow}]$, an addition value column $[x^{\rightarrow}]$, and a boundary flag column $[e'^{\rightarrow}]$ is extracted, and the second table is stably sorted by using the boundary flag column $[e'^{\rightarrow}]$ as a key and giving a priority to a case where a boundary record $([e'^{\rightarrow}]=[0])$ is set to have a high rank.

FIG. 8 illustrates the second table after the first table illustrated in FIG. 7 is processed by the boundary sorting unit 14. The record as the sorting result is expressed by adding "''", that is, $[k''^{\rightarrow}]$, $[x'^{\rightarrow}]$, $[e''^{\rightarrow}]$. As illustrated in FIG. 8, it can be seen that the record of $[e'^{\rightarrow}]=[0]$ is moved to the higher rank. In addition, it can be seen that the order of the records on the first and second rows and the order of the records on the sixth and seventh rows are maintained by the stable sorting. Note that, in order to simplify the description by omitting unnecessary columns, the second table is extracted from the first table in the process of Step S14, but this extraction process is not essential, and it is sufficient to simply sort the first table illustrated in FIG. 7.

<Difference Value Generation Unit 15>

The difference value generation unit 15 generates a difference value by setting an addition value of a highest record in the second table as the difference value as it is and setting, as the difference value, a difference of an addition value of a second record and a subsequent record in the second table from an addition value of a record immediately above the second record or subsequent record. The processing of the difference value generation unit 15 corresponds to processes of the 15th and 16th lines of the algorithm illustrated in FIG. 12.

A case where the second table illustrated in FIG. 8 is processed by the difference value generation unit 15 will be described below with reference to the 15th and 16th lines of the algorithm.

In the example of FIG. 8, the difference value generation unit 15 generates a difference value by setting the addition value of the highest record in the second table as the difference value as it is $([x_1']=[x_1''])$, and setting a difference of the addition values $([x'_i]$, $i=2, \ldots, m)$ of the second and subsequent records in the second table from the addition value $([x'_{i-1}])$ of the record immediately above the second or subsequent records, as the difference value $([x''_i]=[x'_i]-[x'_{i-1}])$.

FIG. 9 illustrates the second table after the second table illustrated in FIG. 8 is processed by the difference value generation unit 15. As illustrated in FIG. 9, $[x''_1]=[x'_1]=[5]$, $[x''_2]=[x'_2]-[x'_1]=[6]-[5]=[1]$, $[x''_3]=[x'_3]-[x'_2]=-[6]=[9]$, . . . , are satisfied. By the above-described boundary sorting process (S14), a value obtained by further adding the total value of the values of the respective groups in the respective key columns is displayed as the addition value at a higher rank (the first to third rows in the example of FIG. 9). By generating the above-described difference value for the addition value, it is possible to extract only the total value of the values in each group by the key column, and thus, this coincides with the result of groupby-sum intended to be obtained ($X''^{\rightarrow}$ on the first to third rows in FIG. 9). Furthermore, by the boundary sorting process (S14), records including a dummy record and records not corresponding to a boundary are displayed at the low ranks (the fourth to seventh rows in the example of FIG. 9) and are not handled as the results of groupby-sum.

<Operation Result Output Unit 16>

The operation result output unit 16 outputs a third table including a key column, a difference value column, and a boundary flag column (S16). Note that the operation result output unit 16 may output a third table including the key column, the difference value column, and the negation of the boundary flag column, and is configured to output a table including the negation of the boundary flag column in the algorithm example of FIG. 12. The processing of the operation result output unit 16 corresponds to processes of the 17th and 18th lines of the algorithm illustrated in FIG. 12.

A case where the second table illustrated in FIG. 9 is processed by the operation result output unit 16 will be described below with reference to the 17th and 18th lines of the algorithm.

In the example of FIG. 9, the operation result output unit 16 sets $(1-[e'^{\rightarrow}])$ of a value obtained by the negation of each element of $[e'^{\rightarrow}]$ as $[e'''^{\rightarrow}]$ (17th line of the algorithm), and outputs $([k''^{\rightarrow}], [x'^{\rightarrow}], [e'''^{\rightarrow}])$ as the third table (18th line of the algorithm). FIG. 10 illustrates the third table after the second table illustrated in FIG. 9 is processed by the operation result output unit 16. Note that, in order to simplify the description by omitting unnecessary columns, the second table is converted into the third table and output in the process of Step S16, but this process is not essential. For example, the secure computation device 1 may execute Steps S11 to S16 described above on the first table and output the first table as it is.

<Second Operation Result Output Unit 17>

In a case where the boundary flag of a certain record in the second table (illustrated in FIG. 9) processed in Step S15 indicates that the record is not the boundary, the second operation result output unit 17 replaces a key of the corresponding record with a key obtained by concealing a predetermined character string, replaces a difference value of the corresponding record with a value obtained by concealing 0, and outputs a fourth table including a key column, a difference value column, and a boundary flag column (S17). The processing of the second operation result output unit 17 corresponds to the processes of the 17th and 18th row of the algorithm (with null processing, corresponding to another version of the algorithm of FIG. 12) illustrated in FIG. 13.

A case where the second table illustrated in FIG. 9 is processed by the second operation result output unit 17 will be described below with reference to the 17th and 18th lines of the algorithm in FIG. 13.

In the example of FIG. 9, in a case where the boundary flag of the i-th record in the second table indicates that the i-th record is not a boundary, the key of the corresponding record is replaced with a key ([null]) in which a predetermined character string (null) is concealed, the difference value of the corresponding record is replaced with a value ([0]) in which 0 is concealed, and a fourth table including the key column, the difference value column, and the boundary flag column, that is, $([k'''^{\rightarrow}], [x''''^{\rightarrow}], [e'''^{\rightarrow}])$ is output as the fourth table (S17). FIG. 11 illustrates the fourth table after the second table illustrated in FIG. 9 is processed by the second operation result output unit 17.

Note that, in order to simplify the description by omitting unnecessary columns, the second table is converted into the fourth table and output in the process of Step S17, but this process is not essential. For example, the secure computation device 1 may execute Steps S11 to S15 and S17 described above on the first table and output the first table as it is.

<Effects of Secure Computation Device 1 in Example 1>

According to the secure computation device 1 in Example 1, the dummy record is set as the lowest record by performing sorting using the dummy flag, and the if sentence processing is added to the boundary determination bit of the group so that the group does not become the boundary in a case where the dummy flag indicates that the corresponding record is the dummy record. In the sum processing, first, the sum from the top is calculated, then only the value to be output is extracted to the high rank by performing sorting, and the difference from the previous value is calculated. In this manner, groupby-sum is achieved without decoding by a combination of addition/subtraction processing without communication.

Supplementary Note

The device according to the present invention includes, for example, an input unit that can be connected to a keyboard or the like as a single hardware entity, an output unit that can be connected to a liquid crystal display or the like, a communication unit that can be connected to a communication device (e.g., a communication cable) capable of communicating with the outside of the hardware entity, a central processing unit (CPU which may include a cache memory or a register), a RAM or a ROM which is a memory, an external storage device as a hard disk, and a bus that connects the input unit, the output unit, the communication unit, the CPU, the RAM, the ROM, and the external storage device so that data can be exchanged therebetween. A device (drive) or the like that can write and read data in and from a recording medium such as a CD-ROM may be provided in the hardware entity, as necessary. Examples of a physical entity including such a hardware resource include a general-purpose computer.

The external storage device of the hardware entity stores programs required for implementing the above-described functions, data required for processing of the programs, and the like (the programs may be stored, for example, in a ROM as a read-only storage device instead of the external storage device). Data or the like obtained by the processing of these programs is appropriately stored in a RAM, an external storage device, or the like.

In the hardware entity, each program stored in the external storage device (or ROM or the like) and data required for processing of each program are read into a memory as necessary and are appropriately interpreted and processed by the CPU. As a result, the CPU implements a predetermined function (each component represented as . . . unit, . . . means, or the like).

The present invention is not limited to the above-described embodiments and can be appropriately modified without departing from the gist of the present invention. The pieces of processing described in the foregoing embodiments may be executed not only chronologically in accordance with the described order, but also in parallel or individually in accordance with the processing capability of a device that executes the processing or as necessary.

As described above, in a case where the processing function of the hardware entity (the device according to the present invention) described in the foregoing embodiments is implemented by a computer, processing details of the function of the hardware entity are described by a program. The computer then executes the program, and thus, the processing function of the hardware entity is implemented in the computer.

Figure 14:
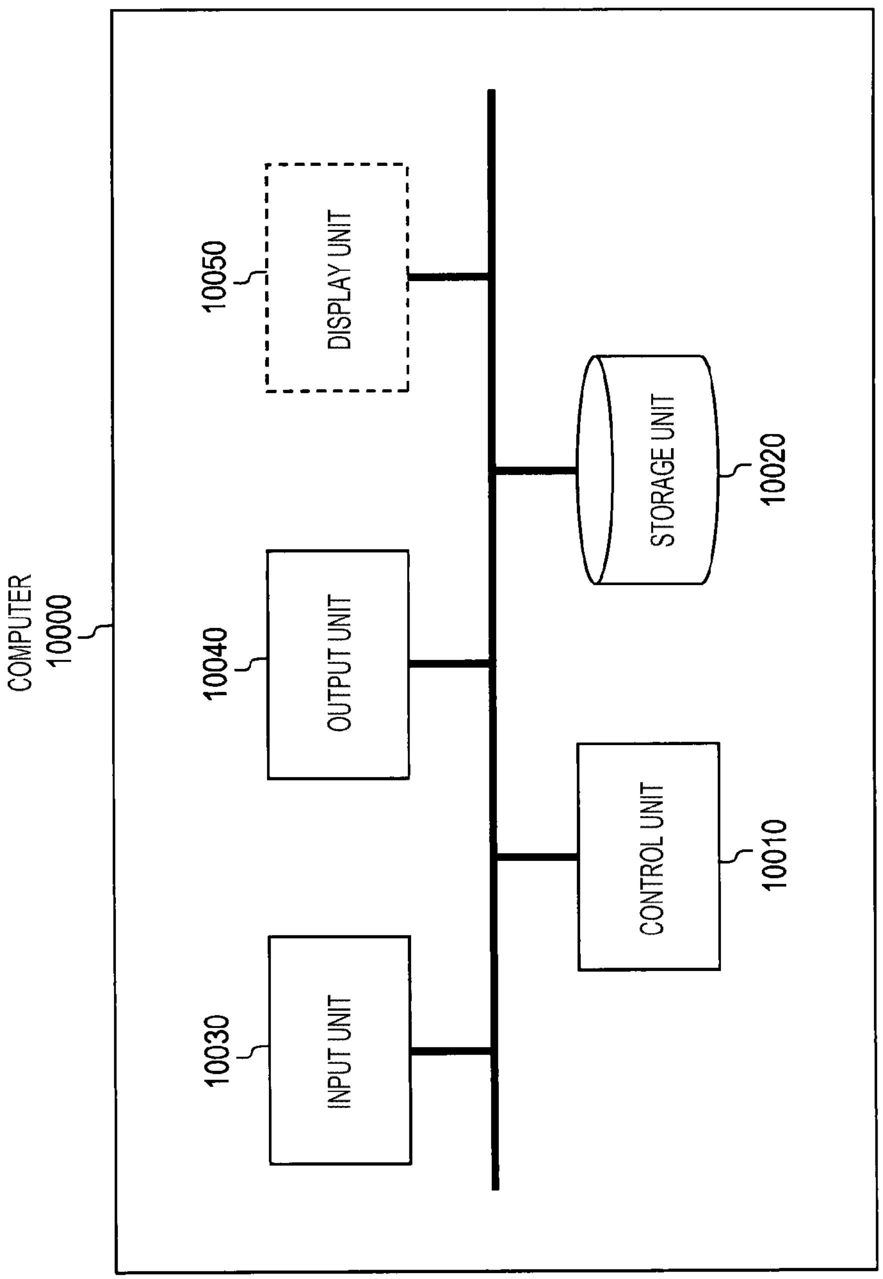
FIG. 14 is a diagram illustrating a functional configuration example of a computer.

The above-described various processes can be performed by causing a recording unit 10020 of a computer 10000 illustrated in FIG. 14 to read a program for executing each step of the foregoing method and causing a control unit 10010, an input unit 10030, an output unit 10040, and the like to operate.

The program in which the processing details are written may be recorded on a computer-readable recording medium. The computer-readable recording medium may be, for example, any recording medium such as a magnetic recording device, an optical disc, a magneto-optical recording medium, or a semiconductor memory. Specifically, for example, a hard disk device, a flexible disk, a magnetic tape, or the like can be used as the magnetic recording device, a digital versatile disc (DVD), a DVD random access memory (DVD-RAM), a compact disc read only memory (CD-ROM), a CD recordable/rewritable (CD-R/RW), or the like can be used as the optical disc, a magneto-optical disc (MO) or the like can be used as the magneto-optical recording medium, and an electrically erasable and programmable-read only memory (EEP-ROM) or the like can be used as the semiconductor memory.

Distribution of the program is performed by, for example, selling, transferring, or renting a portable recording medium such as a DVD or a CD-ROM on which the program is recorded. The program may be stored in a storage device of a server computer, and the program may be distributed by transferring the program from the server computer to another computer via a network.

For example, a computer that executes such a program first temporarily stores, in a storage device of the computer, a program recorded on a portable recording medium or a program transferred from the server computer. Then, when executing processing, the computer reads the program stored in the recording medium of the computer and executes the processing according to the read program. Moreover, as another mode of the program, the computer may read the program directly from a portable recording medium and execute processing according to the program, or alternatively, the computer may sequentially execute processing according to a received program every time the program is transferred from a server computer to the computer. Moreover, the above-described processing may be executed by a so-called application service provider (ASP) type service that implements a processing function only by an execution instruction and result acquisition without transferring the program from a server computer to the computer. Note that the program in this mode includes information used for processing by an electronic computer and is equivalent to the program (data or the like that is not a direct command to the computer but has a property that defines processing of the computer).

Moreover, although the hardware entity is formed by executing a predetermined program in a computer in this mode, at least some of the processing details may be implemented by hardware.

The invention claimed is:

1. A secure computation device that performs a Groupby-sum operation on an encrypted first table including a key column, a value column, and a dummy flag column indicating whether or not a corresponding record is a dummy record, in a state where the first table is concealed based on the key column, the secure computation device comprising:

processing circuitry configured to sort the first table by giving a first priority to a case where, in a case where the corresponding record is not a dummy record, the record is set to have a higher rank, and giving a second priority to the key column;

when a case where a certain record is not the dummy record and a key of the certain record is different from a key of a record immediately below the certain record is set as a first case, a case where a certain record is not the dummy record and a record immediately below the certain record is the dummy record is set as a second case, and a case where a certain record is not the dummy record and is a record located at a bottom is set as a third case, generate a boundary flag having a flag value indicating that a record is a boundary in a case where the record corresponds to any of the first to third cases, and that a record is not the boundary in a case where the record does not correspond to any of the first to third cases;

add all values located at positions higher than a certain record to a value of the certain record and generate an addition value of the corresponding record;

sort a second table including a key column, an addition value column, and a boundary flag column by giving a priority to a case where a boundary record is set to have a higher rank, wherein the sort operation further comprises sorting values of records according to keys while maintaining an initial sequence of two or more equal values of records of a key;

generate a difference value by setting an addition value of a highest record in the second table as the difference value as it is and setting, as the difference value, a difference of an addition value of a second record and a subsequent record in the second table from an addition value of a record immediately above the second record or subsequent record; and output a third table including a key column, a difference value column, and a boundary flag column.

2. The secure computation device according to claim 1, processing circuitry configured to in a case where the boundary flag of a certain record in the second table indicates that the certain record is not the boundary, replace a key of the corresponding record with a key obtained by concealing a predetermined character string, replace a difference value of the corresponding record with a value obtained by concealing 0, and output a fourth table including a key column, a difference value column, and a boundary flag column.

3. A secure computation method performed by a secure computation device that performs a Groupby-sum operation on an encrypted first table including a key column, a value column, and a dummy flag column indicating whether or not a corresponding record is a dummy record, in a state where the first table is concealed based on the key column, the secure computation method comprising:

a step of sorting the first table by giving a first priority to a case where, in a case where the corresponding record is not a dummy record, the record is set to have a higher rank, and giving a second priority to the key column;

a step of, when a case where a certain record is not the dummy record and a key of the certain record is different from a key of a record immediately below the certain record is set as a first case, a case where a certain record is not the dummy record and a record immediately below the certain record is the dummy record is set as a second case, and a case where a certain record is not the dummy record and is a record located at a bottom is set as a third case, generating a boundary flag having a flag value indicating that a record is a boundary in a case where the record corresponds to any of the first to third cases, and that a record is not the boundary in a case where the record does not correspond to any of the first to third cases;

a step of adding all values located at positions higher than a certain record to a value of the certain record and generating an addition value of the corresponding record;

a step of sorting a second table including a key column, an addition value column, and a boundary flag column by giving a priority to a case where a boundary record is set to have a higher rank, wherein the sorting further comprises sorting values of records according to keys while maintaining an initial sequence of two or more equal values of records of a key;

a step of generating a difference value by setting an addition value of a highest record in the second table as the difference value as it is and setting, as the difference value, a difference of an addition value of a second record and a subsequent record in the second table from an addition value of a record immediately above the second record or subsequent record; and a step of outputting a third table including a key column, a difference value column, and a boundary flag column.

4. The secure computation method according to claim 3, further comprising:

a step of, in a case where the boundary flag of a certain record in the second table indicates that the certain record is not the boundary, replacing a key of the corresponding record with a key obtained by concealing a predetermined character string, replacing a difference value of the corresponding record with a value obtained by concealing 0, and outputting a fourth table including a key column, a difference value column, and a boundary flag column.

5. A non-transitory computer readable medium storing a computer program for causing a computer to function as the secure computation device according to claim 1.

* * * * *